United States Patent
Pisha et al.

(10) Patent No.: US 12,464,031 B1
(45) Date of Patent: Nov. 4, 2025

(54) TECHNIQUES FOR EFFICIENT QUERYING OF A DATABASE UTILIZING A LARGE LANGUAGE MODEL AND DYNAMIC POLICY GENERATION

(71) Applicant: Wiz, Inc., New York, NY (US)

(72) Inventors: George Pisha, Giv'atayim (IL); Liran Moysi, Kfar Saba (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/968,613

(22) Filed: Dec. 4, 2024

(51) Int. Cl.
H04L 9/40 (2022.01)

(52) U.S. Cl.
CPC .......... H04L 63/205 (2013.01); H04L 63/102 (2013.01)

(58) Field of Classification Search
CPC .............................. H04L 63/205; H04L 63/102
See application file for complete search history.

(56) References Cited

U.S. PATENT DOCUMENTS

| | | | |
|---|---|---|---|
| 9,258,329 B2 | 2/2016 | Narayanaswamy | |
| 10,541,871 B1 * | 1/2020 | Prahlad | H04L 43/50 |
| 11,288,568 B2 * | 3/2022 | Gu | G06N 3/006 |
| 11,533,312 B2 | 12/2022 | Kuppannan et al. | |
| 11,538,480 B1 * | 12/2022 | Alvarez Barrio | H04W 8/005 |
| 11,652,812 B2 * | 5/2023 | Dykes | H04L 63/108 726/1 |
| 11,765,207 B1 * | 9/2023 | McCarthy | G06F 40/186 |
| 11,936,622 B1 * | 3/2024 | Gonshorowitz | H04L 63/0263 |
| 12,003,529 B1 * | 6/2024 | Cohen | H04L 63/1441 |
| 12,028,368 B1 * | 7/2024 | Cohen | G06F 21/577 |
| 12,095,786 B1 * | 9/2024 | Arbel | H04L 41/16 |
| 12,170,682 B1 * | 12/2024 | Lidgi | H04L 63/20 |
| 12,204,565 B1 * | 1/2025 | Yu | G06F 16/3329 |
| 12,210,949 B1 * | 1/2025 | Silver | G06N 5/025 |
| 2007/0289014 A1 | 12/2007 | Pyo et al. | |
| 2014/0331280 A1 | 11/2014 | Porras et al. | |
| 2021/0157945 A1 * | 5/2021 | Cobb | G06F 21/32 |
| 2023/0208869 A1 * | 6/2023 | Bisht | G06N 7/01 726/23 |
| 2023/0342798 A1 * | 10/2023 | Schultz | G06Q 10/0635 |
| 2024/0333746 A1 * | 10/2024 | Williams | H04L 51/02 |
| 2024/0419977 A1 * | 12/2024 | Perez | G06N 3/09 |
| 2025/0013441 A1 * | 1/2025 | Schneider | G06F 8/41 |
| 2025/0063063 A1 * | 2/2025 | Tishbi | H04L 63/1416 |

* cited by examiner

*Primary Examiner* — Jason Chiang
(74) *Attorney, Agent, or Firm* — M&B IP Analysts, LLC

(57) ABSTRACT

A system and method for dynamically applying controls on a representation of a computing environment utilizing a large language model is presented. The method includes generating a representation of the computing environment, the representation based on a unified data schema; receiving a natural language query directed to the computing environment; generating a first prompt for the large language model (LLM), which when processed outputs an identifier of a policy from a policy engine; generating a second prompt for the LLM, which when processed outputs a generated policy, based on: the unified data schema, and the natural language query; and applying the generated policy on the representation of the computing environment.

17 Claims, 6 Drawing Sheets

TECHNIQUES FOR EFFICIENT QUERYING OF A DATABASE UTILIZING A LARGE LANGUAGE MODEL AND DYNAMIC POLICY GENERATION

TECHNICAL FIELD

The present disclosure relates generally to the field of large language models, and specifically to efficiently generating a cybersecurity policy for a computing environment.

BACKGROUND

Applying a security policy across multiple computing environments poses the significant challenge of maintaining consistent security standards amid diverse technological landscapes. Each computing environment—whether it's a traditional on-premises data center, a public cloud service, or a hybrid setup—has its unique characteristics, configurations, and security protocols. This inherent diversity creates a complex scenario where a one-size-fits-all policy may fall short, leading to potential security vulnerabilities.

A primary issue is the disparity in security tools and mechanisms supported by different environments. For instance, on-premises infrastructures often rely on established, hardware-based security measures, whereas cloud environments may use software-defined security protocols. Integrating these diverse tools under a unified policy requires significant effort in standardizing security practices without compromising the strengths of each environment's native security features.

Furthermore, different environments may follow varied compliance and regulatory standards. A security policy that is compliant in one environment may not meet the regulatory requirements of another. This inconsistency necessitates continual adjustments and monitoring to ensure that the security policy remains effective and legally compliant across all platforms.

Operational management also becomes more complex as administrators need to be proficient in multiple security management tools and practices. The skillsets required to manage security in an on-premises environment differ from those needed in a cloud environment. This can lead to gaps in security knowledge and practice, increasing the risk of oversight and errors.

Another challenge is ensuring seamless integration and interoperability between security controls across environments. Policies that work well in one setup might not integrate smoothly with another, causing potential lapses in security coverage. This inconsistency can be exploited by malicious actors, who look for weak links in the security chain.

Ultimately, the problem lies in achieving a balance between the need for a unified, cohesive security strategy and the practicalities of implementing such a strategy across varied and evolving technological landscapes. This requires not only sophisticated tools and technologies but also a deep understanding of the unique requirements and vulnerabilities of each environment.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include generating a representation of the computing environment, the representation based on an unified data schema. The method may also include receiving a natural language query directed to the computing environment. The method may furthermore include generating a first prompt for the large language model (LLM), which when processed outputs an identifier of a policy from a policy engine. The method may in addition include generating a second prompt for the LLM, which when processed outputs a generated policy, based on: the unified data schema, and the natural language query. The method may moreover include applying the generated policy on the representation of the computing environment. Other embodiments of this aspect include corresponding computer systems, apparatus, and computer programs recorded on one or more computer storage devices, each configured to perform the actions of the methods.

Implementations may include one or more of the following features. The method may include: generating the second prompt further based on a preexisting policy. The method may include: generating the second prompt in response to determining that the first prompt, when processed, outputs no identifier of a policy. The method may include: generating a plurality of second prompts, each second prompt outputting an unique generated policy of a plurality of generated policies. The method may include: selecting a generated policy of the plurality of generated policies; and applying the selected generated policy. The method may include: applying the generated policy on the representation of the computing environment, where the representation includes a plurality of representations, each representation representing a sub-environment of the computing environment. The method may include: generating the first prompt based on: the unified data schema, and a plurality of preexisting policies of a policy engine. The method may include: matching the received natural language query to a policy of a plurality of preexisting policies; and generating the second prompt in response to determining that there is no match between the received natural language query and the policy. Implementations of the described techniques may include hardware, a method or process, or a computer tangible medium.

In one general aspect, non-transitory computer-readable medium may include one or more instructions that, when executed by one or more processors of a device, cause the device to: generate a representation of the computing environment, the representation based on a unified data schema;

receive a natural language query directed to the computing environment; generate a first prompt for the large language model (LLM), which when processed outputs an identifier of a policy from a policy engine; generate a second prompt for the LLM, which when processed outputs a generated policy, based on: Non-transitory computer-readable medium may also include the unified data schema, and the natural language query; and apply the generated policy on the representation of the computing environment. Other embodiments of this aspect include corresponding computer systems, apparatus, and computer programs recorded on one or more computer storage devices, each configured to perform the actions of the methods.

In one general aspect, a system may include one or more processors configured to: The system may also generate a representation of the computing environment, the representation based on an unified data schema. The system may furthermore receive a natural language query directed to the computing environment. The system may in addition generate a first prompt for the large language model (LLM), which when processed outputs an identifier of a policy from a policy engine. The system may moreover generate a second prompt for the LLM, which when processed outputs a generated policy, based on: The system may also include the unified data schema, and the natural language query. The system may furthermore apply the generated policy on the representation of the computing environment. Other embodiments of this aspect include corresponding computer systems, apparatus, and computer programs recorded on one or more computer storage devices, each configured to perform the actions of the methods.

Implementations may include one or more of the following features. The system where the one or more processors are further configured to: generate the second prompt further based on a preexisting policy. The system where the one or more processors are further configured to: generate the second prompt in response to determining that the first prompt, when processed, outputs no identifier of a policy. The system where the one or more processors are further configured to: generate a plurality of second prompts, each second prompt outputting an unique generated policy of a plurality of generated policies. The system where the one or more processors are further configured to: select a generated policy of the plurality of generated policies; and apply the selected generated policy. The system where the one or more processors are further configured to: apply the generated policy on the representation of the computing environment, where the representation includes a plurality of representations, each representation representing a sub-environment of the computing environment. The system where the one or more processors are further configured to: generate the first prompt based on: the unified data schema, and a plurality of preexist policies of a policy engine. The system where the one or more processors are further configured to: match the received natural language query to a policy of a plurality of preexisting policies; and generate the second prompt in response to determining that there is no match between the received natural language query and the policy. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
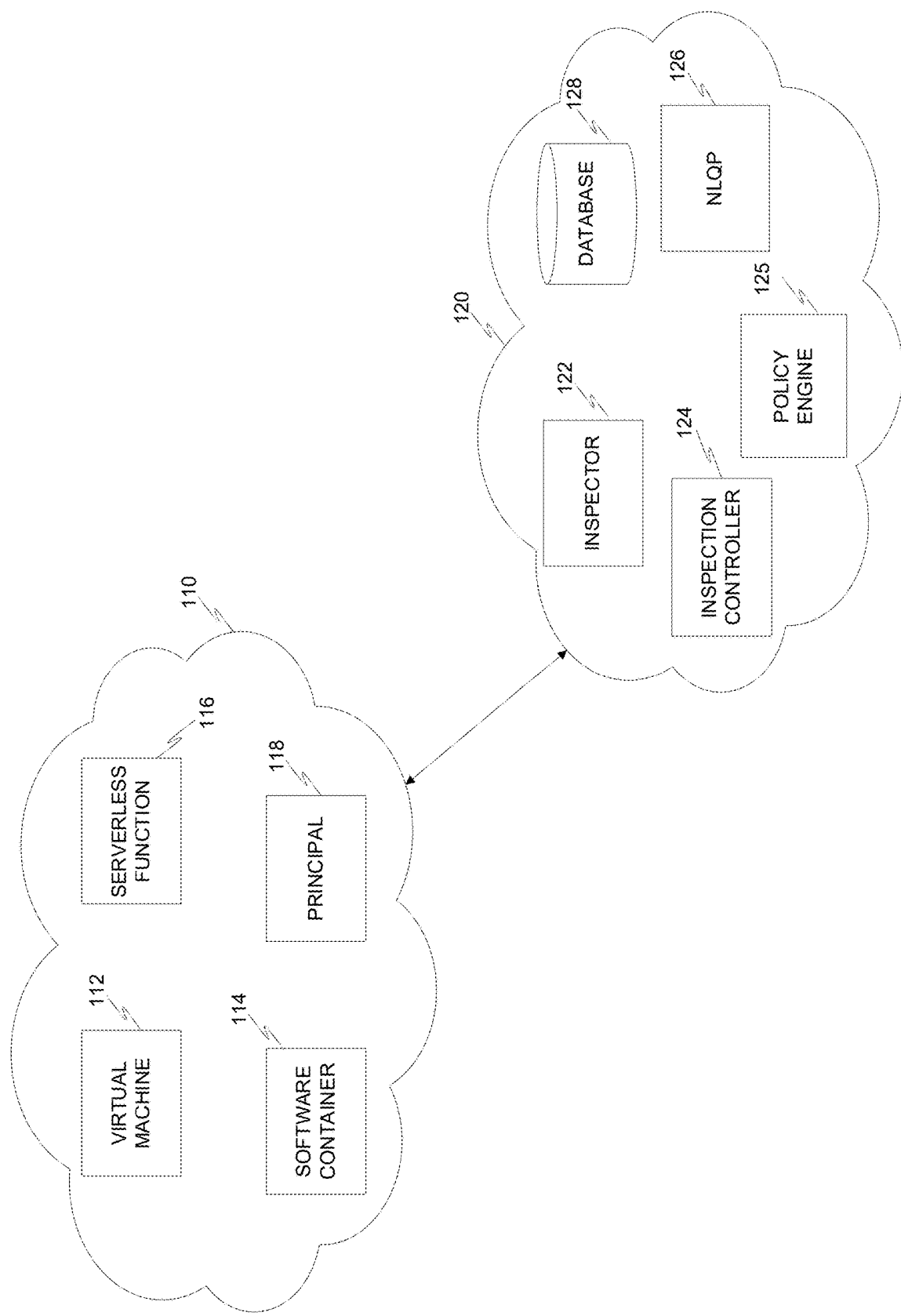
FIG. 1 is a schematic diagram of a cloud computing environment monitored for a cybersecurity threat by an inspection environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a system and method including techniques for efficient querying of a database utilizing a large language model.

FIG. 1 is an example schematic diagram of a computing environment communicatively coupled with a cybersecurity inspection environment, utilized to describe an embodiment. A computing environment 110 is, according to an embodiment, a cloud computing environment, a networked environment, an on-premises environment, a combination thereof, and the like.

For example, in an embodiment, a cloud computing environment is implemented as a virtual private cloud (VPC), a virtual network (VNet), and the like, on a cloud computing infrastructure. A cloud computing infrastructure is, according to an embodiment, Amazon® Web Services (AWS), Google® Cloud Platform (GCP), Microsoft® Azure, and the like.

In certain embodiment, the computing environment 110 includes a plurality of entities. An entity in a computing environment 110 is, for example, a resource, a principal 118, and the like. A resource is, according to an embodiment, a hardware, a baremetal machine, a virtual machine, a virtual workload, a provisioned hardware (or portion thereof, such as a processor, a memory, a storage, etc.), and the like.

A principal 118 is an entity which is authorized to perform an action on a resource, initiate an action in the computing environment 110, initiate actions with respect to other principals, a combination thereof, and the like. According to an embodiment, a principal is a user account, a service account, a role, a combination thereof, and the like.

In certain embodiments, a resource in a computing environment is a virtual machine 112, a software container 114, a serverless function 116, and the like. For example, in an embodiment, a virtual machine 112 is implemented as an Oracle® VirtualBox®. In some embodiments, a software container 114 is implemented utilizing a Docker® Engine, a Kubernetes® platform, combinations thereof, and the like. In certain embodiments, a serverless function 116 is implemented in AWS utilizing Amazon Lambda®.

In some embodiments, the computing environment 110 is implemented as a cloud environment which includes multiple computing environments. For example, a first cloud computing environment is utilized as a production environment, a second cloud computing environment is utilized as a staging environment, a third cloud computing environment is utilized as a development environment, and so on. Each such environment includes, according to an embodiment, a resource, a principal, and the like, having a counterpart in the other environments.

For example, according to an embodiment, a first virtual machine 112 is deployed in a production environment, and a corresponding first virtual machine is deployed in a staging environment, which is essentially identical to the production environment.

In an embodiment, the computing environment 110 is monitored by an inspection environment 120. According to an embodiment, the inspection environment 120 is configured to inspect, scan, detect, and the like, cybersecurity threats, cybersecurity risks, cybersecurity objects, misconfigurations, vulnerabilities, exploitations, malware, combinations thereof, and the like.

In certain embodiments, the inspection environment 120 is further configured to provide a mitigation action, a remediation action, a forensic finding, a combination thereof, and the like.

In some embodiments, an inspector 122 is configured to detect a cybersecurity object in a workload deployed in the computing environment 110. For example, in an embodiment, the inspector is a software container pod configured to detect a predetermined cybersecurity object in a disk, access to which is provided to the inspector 122 by, for example, the inspection controller 124.

In an embodiment, a cybersecurity object is a password stored in cleartext, a password stored in plaintext, a hash, a certificate, a cryptographic key, a private key, a public key, a hash of a file, a signature of a file, a malware object, a code object, an application, an operating system, a combination thereof, and the like.

In certain embodiments, the inspector 122 is assigned to inspect a workload in the computing environment 110 by an inspection controller 124. In an embodiment, the inspection controller initiates inspection by, for example, generating an inspectable disk based on an original disk. In an embodiment, generating the inspectable disk include generating a copy, a clone, a snapshot, a combination thereof, and the like, of a disk of a workload deployed in the computing environment 110, and providing access to the inspectable disk (for example by assigning a persistent volume claim) to an inspector 122.

In an embodiment, where an inspector 122 detects a cybersecurity object in a disk of a workload, a representation is generated and stored in a security database 128. In certain embodiments, the database is a columnar database, a graph database, a structured database, an unstructured database, a combination thereof, and the like. In certain embodiments, the representation is generated based on a predefined data schema. For example, a first data schema is utilized to generate a representation of a resource, a second data schema is utilized to generate a representation of a principal, a third data schema is utilized to generated a representation of a cybersecurity object, etc.

For example, according to an embodiment, the representation is stored on a graph database, such as Neo4j®. In certain embodiments, a resource is represented by a resource node in the security graph, a principal is represented by a principal node in the security graph, etc.

In some embodiments, the inspection environment 120 further includes a natural language query processor 126 (NLQP 126). In an embodiment, the NLQP 126 is configured to receive a query in a natural language, and generate, based on the received query, a structured query which is executable on the database 128.

In certain embodiments, it is advantageous to provide a user with an interface to query the database 128 in a natural language. It is further advantageous to provide a system and method that provides accurate translation between a query received in natural language and a database query, in order to provide a user with a relevant result to their query.

In some embodiments, the policy engine 125 is configured to apply a policy on a representation of the computing environment, such as a representation stored in a security database, a security graph, and the like. In some embodiments, the policy is generated by a natural language query processor, such as discussed in more detail herein. In an embodiment, applying a policy includes extracting data from a security database, and processing the policy with the extracted data as an input to determine if a condition of the policy is met (or not met). In some embodiments, in response to a policy condition being met (or not met) an action is initiated in the computing environment 110. For example, the action is a mitigation action, a remediation action, a combination thereof, and the like.

Figure 2:
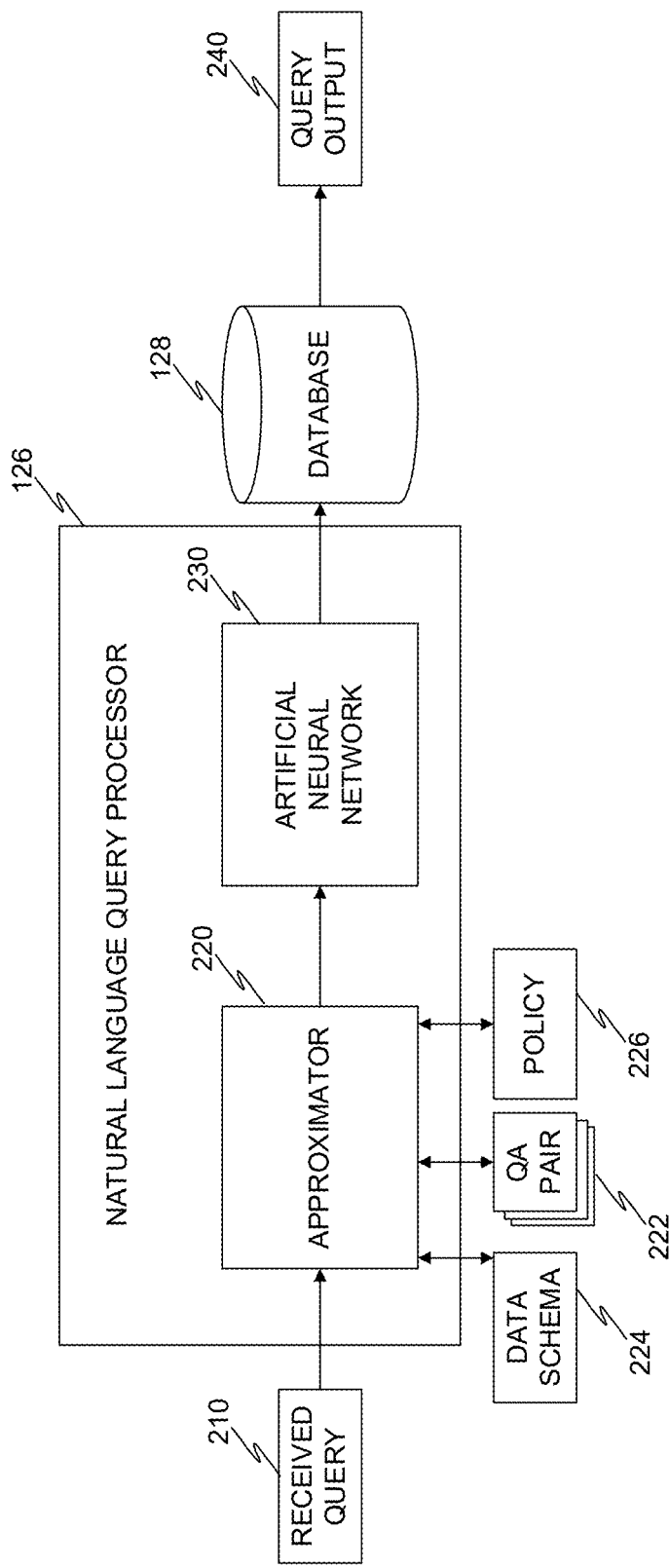
FIG. 2 is a schematic illustration of a natural language query processor, implemented in accordance with an embodiment.

FIG. 2 is an example schematic illustration of a natural language query processor, implemented in accordance with an embodiment. In certain embodiments, the natural language query processor 126 (NLQP 126) is implemented as a virtual workload in an inspection environment. In some embodiments, the NLQP 126 includes an approximator 220, and an artificial neural network (ANN) 230. In some embodiments, the ANN 230 is a large language model, such as GPT, BERT, and the like. While an LLM is discussed here, other embodiments can utilize various generative artificial intelligence (AI) models, such as language models (e.g., small language models, large language models), generative adversarial networks (GANs), combinations thereof, and the like.

In an embodiment, the NLQP 126 receives a query 210. In some embodiments, the received query 210 is a query in natural language, such as an English language query. In an embodiment, the received query 210 cannot be executed on a database, such as security database 128. In certain embodiments, the security database 128 includes a representation of a computing environment, such as the computing environment 110 of FIG. 1 above.

In an embodiment, the received query 210 is provided to the approximator 220. In an embodiment, the approximator 220 includes a large language model (LLM), such as GPT, BERT, and the like.

In some embodiments, the LLM (e.g., of the approximator 220, the ANN 230, etc.) includes a fine-tuning mechanism. In an embodiment, fine-tuning allows to freeze some weights of a neural network while adapting others based on training data which is unique to a particular set of data.

In certain embodiments, an LLM cannot be fine-tuned, for example due to a lack of access to weights of the model. In such embodiments, it is advantageous to provide the LLM with additional data in order to generate a result which is accurate and relevant.

For example, in an embodiment, the approximator 220 is provided with a plurality of query-answer (QA) pairs 222, and a data schema 224. In an embodiment, the QA pairs 222 include each a database query and a corresponding response. In some embodiments, the query of the QA pair 222 is a query which was previously executed on the database 128.

In some embodiments, the data schema 224 is a data schema of the database 128. In some embodiments, a plurality of data schemas 224 are utilized. For example, in an embodiment, the plurality of data schemas 224 include a data schema for a principal, a data schema for a resource, a data schema of a cloud computing environment, combinations thereof, and the like.

In an embodiment, the approximator 220 is configured to generate a prompt based on a predetermined template, the received query 210, a QA pair 222, and the data schema 224. In some embodiments, the approximator is configured to receive the query 210 and generate a selection of a QA pair 222 from a plurality of QA pairs. For example, in an embodiment, the approximator is configured to receive the query 210, and generate a prompt for an LLM to detect from a plurality of QA pairs, a QA pair 222 which is the closest match to the received query 222. In some embodiments, the prompt further includes the data schema 224.

In an embodiment, the output of the approximator 220 is a QA pair 222 which an LLM of the approximator 220 outputs as being the closest match to the received query 210. In some embodiments, the approximator 220 outputs a group of QA pairs from the plurality of QA pairs.

In certain embodiments, the output of the approximator 220 is provided to the ANN 230. In an embodiment, the ANN 230 is configured to generate a database query (i.e., a query which is executable by a database, database management system, etc.) based on the output of the approximator 220. In some embodiments, the ANN 230 includes an LLM, and is configured to generate a prompt for the LLM based on the received output, the received query 210, and the data schema 224.

For example, in an embodiment, the ANN 230 is configured to receive the query 210, a QA pair 222 selected by the approximator 220, and the data schema 224 as inputs. The ANN 230 is further configured to generate a prompt for an LLM based on the received inputs, which, according to an embodiment, configures the LLM to output a database query based on the received inputs.

In an embodiment, the outputted database query is executed on a database 128 to provide a query output 240. In an embodiment, a plurality of database queries are outputted by the NLQP 216, each of which is executed on a database, such as database 128. In such embodiments, a plurality of query outputs 240 are generated.

In some embodiments, the query output 240 is provided to a client device, a user account, a user interface, rendered for display on a graphical user interface, a combination thereof, and the like.

According to an embodiment, the approximator 220 is configured to receive a policy 226, a plurality of policies, and the like, which are utilized in generating a policy by the ANN 230. For example, in an embodiment, the received query 210 is a natural language statement which is directed at generating a cybersecurity policy. In an embodiment, the approximator 220 is configured to receive an existing policy 226, a plurality of existing policies, and the like, and generate a new policy based on the received query 210 and the policy 226.

In some embodiments, the ANN 230 is configured to generated a prompt for an LLM which when executed utilizing the LLM outputs a policy which is enforced, for example, on a representation of a computing environment, such as stored in the security database 128 of FIG. 1 above.

In an embodiment, a first policy is provided to the approximator 220 utilizes a first language format, while a second policy is provided to the approximator 220 which utilizes a second language format (e.g., Rego). According to some embodiments, the ANN 230 is further configured to generate a policy for a specific format, framework, and the like, and is configured to utilize policies of different frameworks.

In certain embodiments, the NLQP 126 is further configured to simulate an application of a policy. For example, in an embodiment, it is advantageous to simulate an application of a policy which was generated by a large language model, as these LLMs are prone to generating responses known colloquially as 'hallucinations'.

In this regard, a hallucination is a response, result, and the like, of executing a prompt, which while appearing to be correct, does not in practice result in the intended manner. In the context of cybersecurity policies, a hallucination is, according to an embodiment, a result which appears to be a correct policy, but when applied produces results which were not intended. For example, according to an embodiment, applying a policy which aims to detect S3 buckets without encryption, and receiving an identifier of an S3 bucket which includes encryption, would be a policy which does not perform as intended.

In certain embodiments, a policy is associated with an action, such as a remediation action, a mitigation action, a combination thereof, and the like. In some embodiments, a simulating a policy application on a representation of a computing environment includes generating a list of entities which fail the policy, without executing any action which is associated with the policy.

Figure 3:
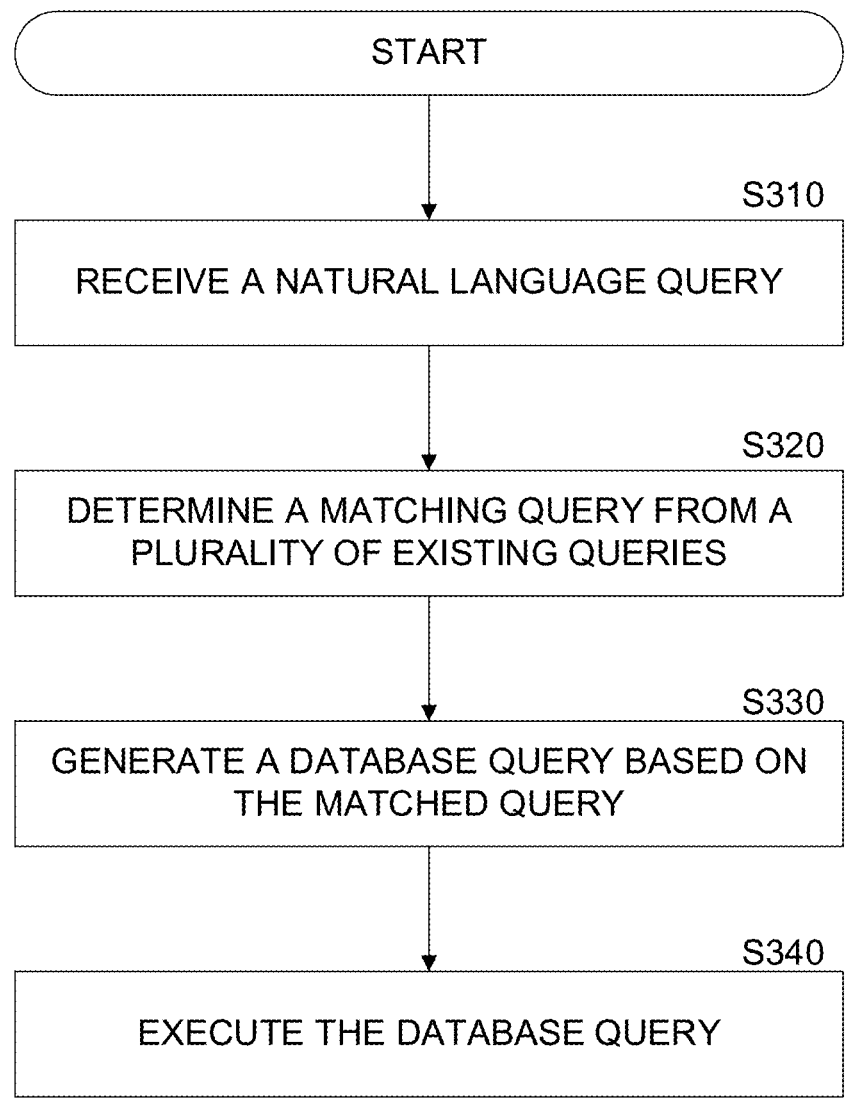
FIG. 3 is a flowchart of a method for generating a database query based on a natural language query, implemented in accordance with an embodiment.

FIG. 3 is an example flowchart of a method for generating a database query based on a natural language query, implemented in accordance with an embodiment. In an embodiment, the method is performed by utilizing an artificial neural network.

At S310, a natural language query is received. In an embodiment, the natural language query is received through a user interface, a graphical user interface, and the like. In some embodiments, a natural language query is an unstructured query, a partially structured query, and the like. For example, a structured query is a query which can be executed on a database to produce a result, whereas an unstructured query, a partially structured query, and the like, cannot be executed on a database to produce a result, according to an embodiment.

For example, according to an embodiment, a natural language query is "public ECRs with container images that contain cloud keys", "find all vulnerabilities that can be exploited remotely", "find all vulnerabilities that lead to information disclosure".

In some embodiments, the natural language query is processed for tokenization. In an embodiment, each word in the natural language query is mapped to a tokenized word, tokenized word portion, and the like. For example, in an embodiment, vulnerability, vulnerabilities, vulnerabilities (with an incorrect spelling) are all mapped to a single term (e.g., "vulnerable"), and the single term is tokenized. This is advantageous as the context is preserved while tokenization is minimized, since only a single term is tokenized, rather than having to tokenize each different term.

At S320, an existing query is selected. In an embodiment, the existing query is an existing database query. In some embodiments, the selection includes a query pair, including a database query and a response, result, and the like, which is generated based on execution of the database query on a database.

In an embodiment, the existing query is selected from a group of preselected queries. In some embodiments, a match is determined between the natural language query and a plurality of existing queries. In certain embodiments, generating a match includes determining a match score. For example, in an embodiment, a match score is generated between a natural language query and a preexisting database query based on natural language processing (NLP) techniques, such as the distance-based Word2Vec.

For example, in an embodiment, a distance is determined between the received natural language query and a first preexisting database query, and between the received natural language query and a second preexisting database query. In certain embodiments, the preexisting query having a shorter distance to the natural language query is selected as the matched query.

At S330, a database query is generated. In an embodiment, the database query is generated based on the received natural language query and the selected existing query. In certain embodiments, the database query is generated by adapting the existing query to the received natural language query. In an embodiment, adapting the existing query based on the received natural language query is performed by an artificial neural network, such as a generative ANN. In some embodiments, the adaptation is performed by a generative adversarial network (GAN), which includes a generator network and a discriminator network.

At S340, the database query is executed. In an embodiment, executing a database query includes configuring a database management system to receive a database query, execute the database query on one or more datasets stored in the database, and generate a result.

In certain embodiments, where a plurality of database queries are generated, each query is executed on a database. According to an embodiment, each query is executed on the same database, a different database, a combination thereof, and the like.

Figure 4:
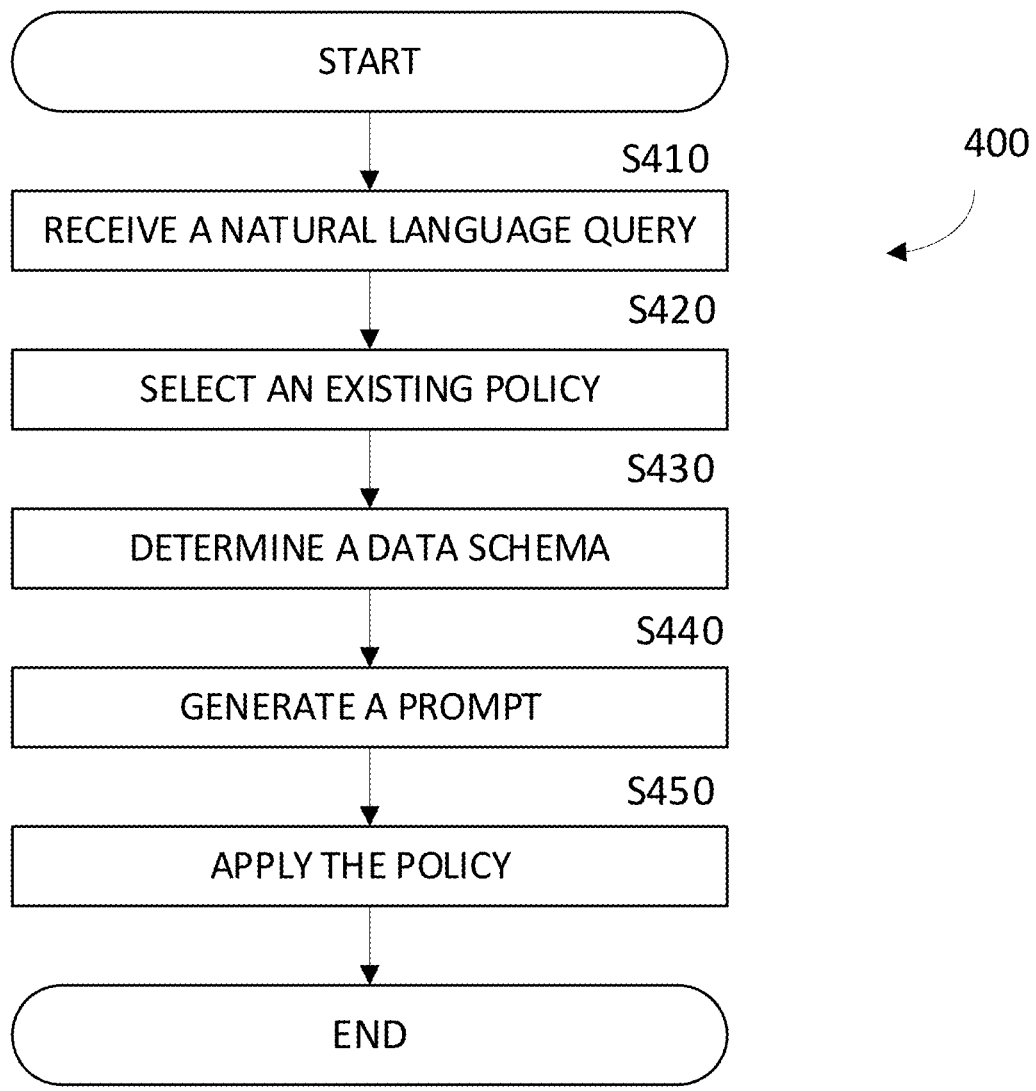
FIG. 4 is a flowchart of a method for generating a database query based on a natural language query utilizing a large language model, implemented in accordance with an embodiment.

FIG. 4 is an example flowchart 400 of a method for generating a cybersecurity policy based on a natural language query utilizing a large language model, implemented in accordance with an embodiment. In an embodiment, the method is performed by utilizing an artificial neural network such as an LLM. For example, an LLM is, according to an embodiment, GPT, BERT, and the like.

In certain embodiments, a policy is generated based on a predefined schema, for example, in an embodiment, a policy is generated in a schema associated with Rego language, which is utilized by an OPA engine to apply a policy.

At S410, a natural language query is received. In an embodiment, the natural language query is received through a user interface, a graphical user interface, and the like. In some embodiments, a natural language query is an unstructured query, a partially structured query, and the like. For example, a structured query is a query which can be executed on a database to produce a result, whereas an unstructured query, a partially structured query, and the like, cannot be executed on a database to produce a result, according to an embodiment.

For example, according to an embodiment, a natural language query is "S3 bucket with encryption disabled", "vulnerabilities that can be exploited remotely", "vulnerabilities that lead to information disclosure", etc.

In some embodiments, the natural language query is processed for tokenization. In an embodiment, each word in the natural language query is mapped to a tokenized word, tokenized word portion, and the like. For example, in an embodiment, vulnerability, vulnerabilities, vulnerabilities (with an incorrect spelling) are all mapped to a single term (e.g., "vulnerable"), and the single term is tokenized. This is advantageous as the context is preserved while tokenization is minimized, since only a single term is tokenized, rather than having to tokenize each different term.

At S420, an existing policy is selected. In an embodiment, the existing policy is selected from a group including policies encoded in multiple types of different languages, different codes, different schemas, a combination thereof, and the like.

In some embodiments, a plurality of existing policies are selected. In certain embodiments, an existing policy is matched to the received query. For example, in an embodiment, an existing policy is vectorized to produce a first vector in a feature space, for example utilizing Word2Vec, and the query is vectorized to produce a second vector in the feature space.

In an embodiment, a distance is determined between the first vector and the second vector, and an existing policy is determined to be a match to the query where the determined distance is at a threshold, below a threshold, etc.

In certain embodiments, a prompt is generated for an LLM to determine if an existing policy matches a received natural language query. In an embodiment, where an output of executing the prompt utilizing the LLM indicates that the policy matches, another prompt is generated to determine if another existing policy matches the natural language query. In certain embodiments, a match score is determined for the match, for example based on a vector distance in a feature space.

At optional S430, a data schema is determined. In certain embodiments a plurality of data schemas are determined. In an embodiment, the data schema is determined based on the natural language query. For example, in an embodiment, a keyword, a phrase, and the like, are detected in the natural language query.

In some embodiments, the natural language query is received as a text input which is parsed, and a keyword is detected in the parsed text. In an embodiment, the keyword, phrase, and the like, is matched to a data schema. For example, in the natural language query "S3 bucket with encryption disabled", the keyword "bucket" corresponds to a data schema of a resource.

At S440, a prompt is generated. In an embodiment, the prompt is generated for a large language model. In some embodiments, the prompt is generated based on a predefined template. In certain embodiments, the prompt includes the natural language query, a selected existing policy, a data schema, a combination thereof, and the like.

In an embodiment, the prompt, when executed utilizing an LLM, generates an output which includes a policy. In some embodiments, the output includes a policy generated in a specific schema, language, code, etc., such as Rego. In an embodiment, the prompt further utilizes a retrieval augmented generation (RAG) technique. In such an embodiment, a data schema is utilized for the RAG.

At S450, the policy is applied. In an embodiment, the policy is extracted from an output of an LLM. In some embodiments, the policy is applied by providing the policy to an engine, such as the OPA engine.

According to an embodiment, a policy is applied on a representation of a computing environment. For example, according to an embodiment, a policy is applied on a representation of a computing environment, such as the representation of the computing environment which is stored in the security database 128 of FIG. 1 above.

In some embodiments, applying a policy includes performing a check to determine if the policy is a valid policy. For example, in an embodiment, a hallucination detection technique is applied to the policy to determine if the generated policy, when applied, corresponds to an intent of a user which provided the natural language query.

In an embodiment, a validity check includes simulating applying the policy on a representation of the computing environment, receiving a result of applying the policy, and determining if the result is an expected result. For example, in an embodiment, where the natural language query is "S3 bucket with encryption disabled", a policy is generated which when applied to a representation of the computing environment flags an S3 bucket with encryption enabled, then the policy is an invalid policy (i.e., not a valid policy).

In certain embodiments, where a policy fails a validity check, the steps of the method are repeated to generate a new policy. In some embodiments, the policy which failed the validity check is provided to the LLM (e.g., through a prompt, utilizing RAG, etc.) in order to provide an example of a failed policy. According to an embodiment, this reduces the probability that the LLM will again produce the same policy, a variation thereof, and the like, which has previously failed.

In some embodiments, a policy further includes a remediation action, a mitigation action, a combination thereof, and the like. For example, in an embodiment, an action includes generating an alert, generating an alert severity, updating an alert severity, generating a ticket, sandboxing a resource, disabling a principal, a combination thereof, and the like.

Figure 5:
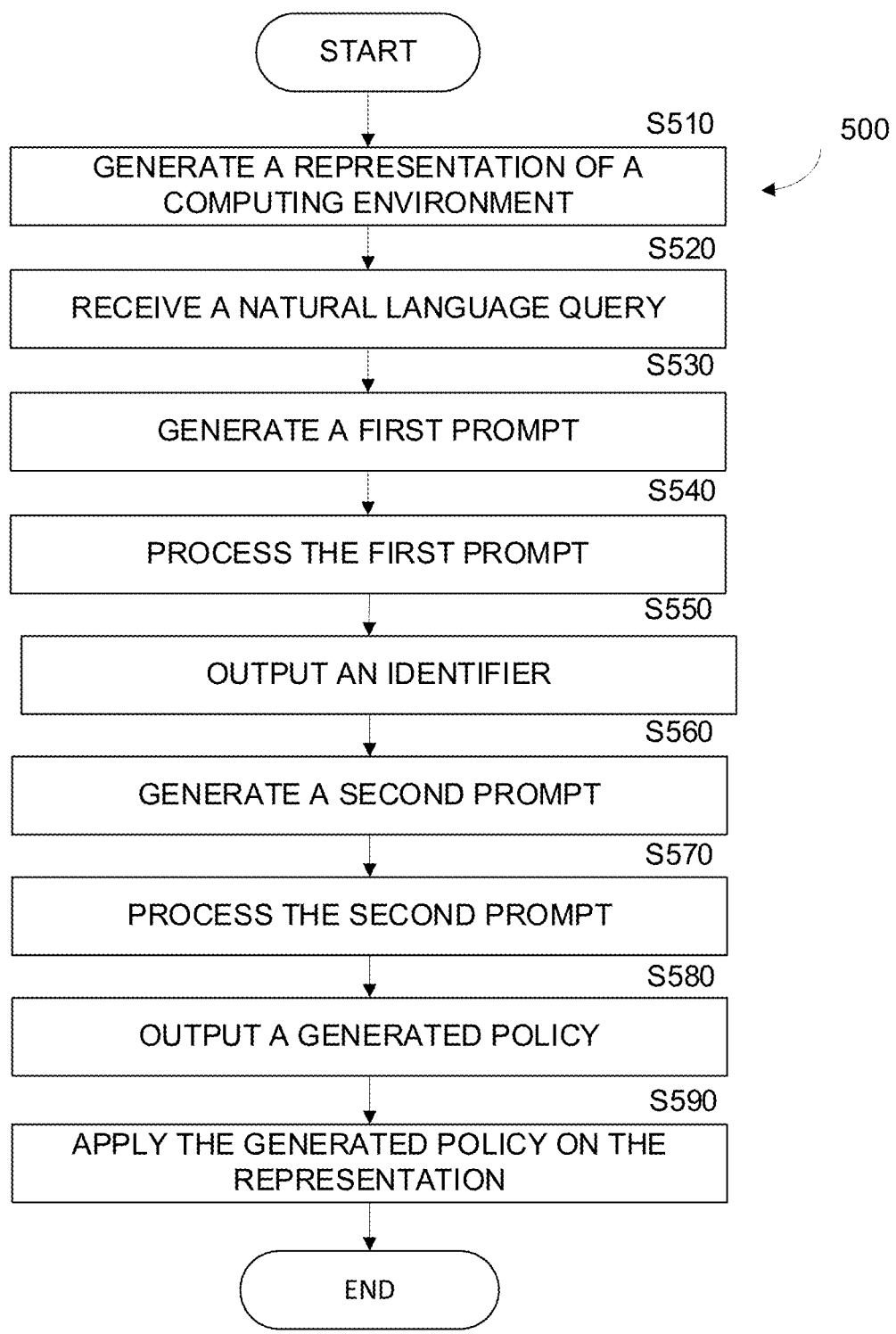
FIG. 5 is a flowchart of a method for outputting a generated policy using a large language model.

FIG. 5 is an example flowchart 500 of a method for outputting a generated policy using a large language model.

At S510, a representation of a computing environment is generated. In some embodiments, the representation of the computing environment is based on a unified data schema. A computing environment (FIG. 1, 110) is, according to an embodiment, a cloud computing environment, a networked environment, an on-premises environment, a combination thereof, and the like. A unified data schema represents the consolidation of data from different sources represented into a single dataspace.

In an embodiment, a computing environment is inspected for entities such as resources, principals, and the like. In some embodiments, the entities are inspected for cybersecurity objects, software artifacts, code objects, and the like.

In certain embodiments, a result of inspecting the computing environment, entities thereof, and the like, are stored in a security database as a representation of the computing environment. In some embodiments, the computing environment includes a plurality of related computing environments, such as a production environment, a testing environment, a staging environment, an infrastructure as code environment, a platform as a service (PaaS) environment, a software as a service (SaaS) environment, various combinations thereof, and the like.

According to an embodiment, a policy, control, and the like, are applied on the representation of the computing environment. In some embodiments, an action is initiated in the computing environment based on a result of applying a policy, control, and the like, on the representation of the computing environment.

At S520, a natural language query is received. In certain embodiments, the natural language query is a statement, comment, question, and the like, in plain human language. In an embodiment, a natural language query is an unstructured query. In certain embodiment, the natural language query includes a structured portion and an unstructured portion.

In some embodiments, the natural language query is directed to the computing environment. For example, in an embodiment, "who are the users that have access to this sensitive data", constitutes a natural language query.

In an embodiment, the natural language query includes a statement directed to a policy of the computing environment, for example "if there are external users who can access sensitive data generate a policy to prevent this".

At S530, a first prompt is generated. In an embodiment, a first prompt is generated for a large language model. In certain embodiments, the first prompt is based on the natural language query, the unified data schema, a preexisting policy of a policy engine, a combination thereof, and the like.

In an embodiment, the first prompt is generated by modifying a preexisting prompt template. In some embodiments, the prompt template is modified based on the natural language query, the unified data schema, a preexisting policy of a policy engine, a combination thereof, and the like.

At S540, the first prompt is processed. In an embodiment, the first prompt is processed by tokenizing the prompt and providing the tokenized prompt for processing by a large language model. According to an embodiment, each word, word portion, etc. in the prompt is mapped to a unique token.

In an embodiment, processing the first prompt is performed utilizing an LLM having a predetermined first context length. In some embodiments, a retrieval augment generation technique is used, for example by providing the LLM the unified data schema as part of the context. In an embodiment, a context length indicates a number of tokens utilized as an input for the LLM.

According to some embodiments, a specific LLM model is selected based on the context length. For example, in an embodiment, a first LLM model is selected for processing the first prompt in response to determining that the context needs to includes the unified data schema, a plurality of preexisting policies, and the modified template. In an embodiment, a second LLM model is selected for processing the first prompt in response to determining that the context needs to include only the modified template, wherein the context length of the second LLM is shorter than the context length of the first LLM. A shorter context length requires less processing power.

At S550, an identifier is outputted. In some embodiments, the identifier is of a policy from a policy engine. In an embodiment, the identifier is extracted from an output of an LLM which is configured to process the first prompt. In some embodiments, the identifier uniquely identifies a specific policy, where such a policy exists.

For example, according to an embodiment, the first prompt is generated to identify a policy which matches the natural language query. This is useful, according to some embodiments, to determine whether a policy on a computing environment already exists, or if a new one needs to be generated.

In some embodiments, where a policy does not exist, outputting an identifier includes generating an output which indicates that an identifier does not exist, a policy does not exist, etc.

In certain embodiments, a policy, a plurality of policies, and the like, is selected which are the closest match to the natural language query. In an embodiment, in response to detecting that a policy does not exist, another prompt is generated which when executed outputs a policy which is the closest policy matching the natural language query.

At S560, a second prompt is generated. In an embodiment, the second prompt is generated for a second large language model, for example which has a different context length than the first large language model.

In some embodiments, the second prompt is only generated when it is determined that the first prompt when processed does not output an identifier of the policy. In some embodiments, the second prompt is generated based on the natural language query, the unified data schema, a preexisting policy of a policy engine, a combination thereof, and the like.

In an embodiment, the second prompt is generated by modifying a preexisting prompt template. In some embodiments, the prompt template is modified based on the natural language query, the unified data schema, a preexisting policy of a policy engine, a closest policy matching the natural language query, a combination thereof, and the like.

At S570, the second prompt is processed. In an embodiment, the second prompt is processed by tokenization. In an embodiment, each word in the second prompt is mapped to a tokenized word, tokenized word portion, and the like.

In an embodiment, the second prompt is processed by tokenizing the prompt and providing the tokenized prompt for processing by a large language model. According to an embodiment, each word, word portion, etc. in the prompt is mapped to a unique token.

In an embodiment, processing the second prompt is performed utilizing an LLM having a predetermined first context length. In some embodiments, a retrieval augment generation technique is used, for example by providing the LLM the unified data schema as part of the context. In an embodiment, a context length indicates a number of tokens utilized as an input for the LLM.

According to some embodiments, a specific LLM model is selected based on the context length. For example, in an embodiment, a first LLM model is selected for processing the first prompt in response to determining that the context needs to includes the unified data schema, a plurality of preexisting policies, and the modified template. In an embodiment, a second LLM model is selected for processing the second prompt in response to determining that the context needs to include only the modified template, wherein the context length of the second LLM is shorter than the context length of the first LLM. A shorter context length requires less processing power.

At S580, a generated policy is outputted. In some embodiments, the generated policy is based on the unified data schema, the natural language query, the modified template, a preexisting policy, a plurality of preexisting policies, a combination thereof, and the like.

In an embodiment, the policy is generated by processing the second prompt utilizing an LLM, wherein the output includes a generated policy, for example as a code object, a plurality of code objects, and the like.

At S590, the generated policy is applied on the representation. In an embodiment, the generated policy is applied on the representation of the computing environment. In certain embodiments, applying a policy on a representation includes performing a check to determine if a condition of the policy is true or false.

For example, according to an embodiment, a policy checks to determine if a database deployed in the computing environment is password protected. In an embodiment, this includes traversing a security database to detect a representation of a database, and reading the data from the representation of the database to determine if the database is password protected or not.

In some embodiments, a result of the policy (e.g., pass, fail, true, false, etc.) triggers a mitigation action in the computing environment. For example, in an embodiment, a mitigation action includes generating an access policy for an identity and access management (IAM) service, revoking a permission from a principal, revoking access to a resource, revoking access from a resource, generating an alert, generating a ticket, updating a severity of a ticket, updating a severity of an alert, a combination thereof, and the like.

Figure 6:
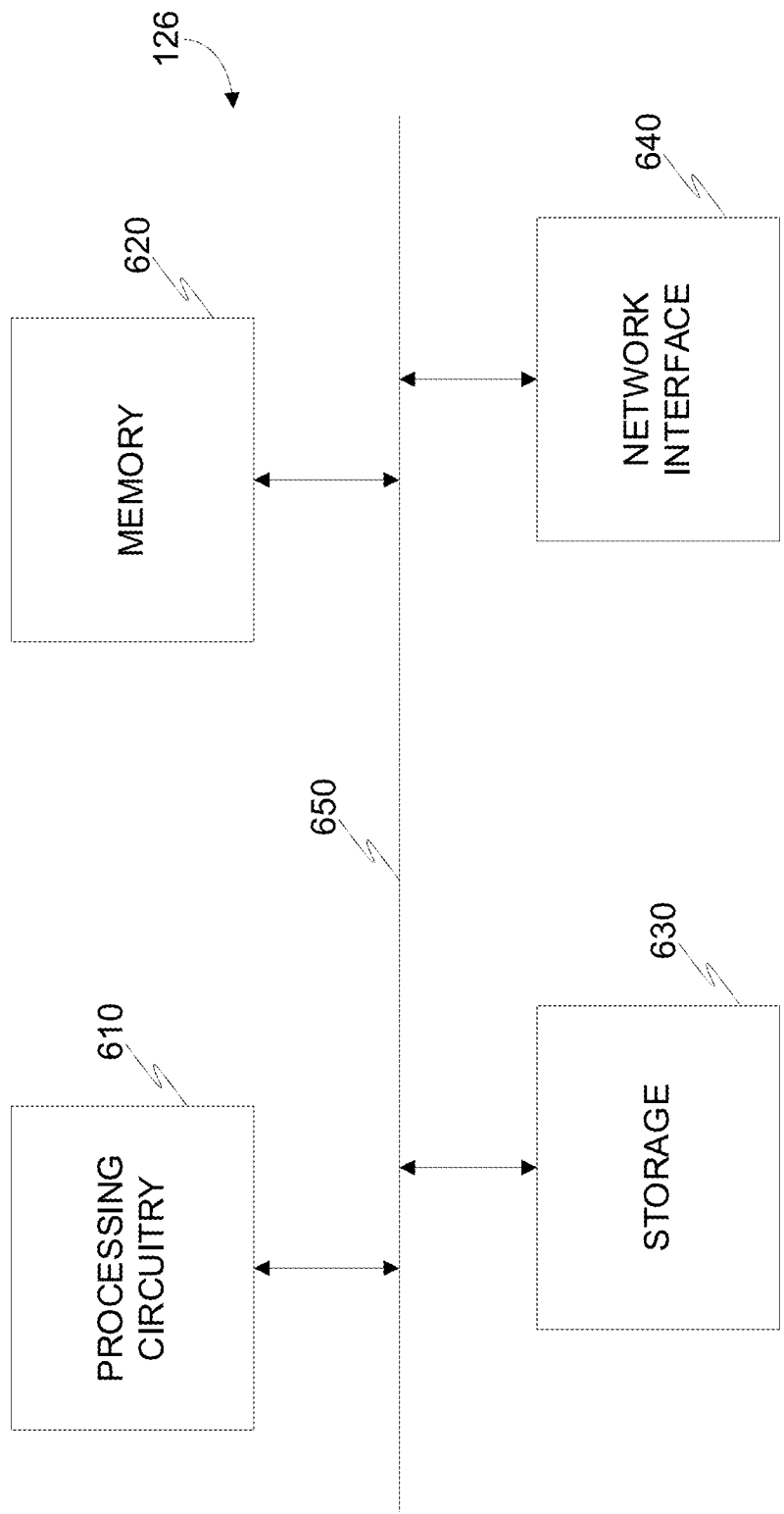
FIG. 6 is a schematic diagram of a natural language processor in accordance with an embodiment.

FIG. 6 is an example schematic diagram of a natural language query processor 126 according to an embodiment. The natural language query processor 126 includes a processing circuitry 610 coupled to a memory 620, a storage 630, and a network interface 640. In an embodiment, the components of the natural language query processor 126 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof. In an embodiment, the memory 620 is an on-chip memory, an off-chip memory, a combination thereof, and the like. In certain embodiments, the memory 620 is a scratch-pad memory for the processing circuitry 610.

In one configuration, software for implementing one or more embodiments disclosed herein may be stored in the storage 630, in the memory 620, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 640 is configured to provide the natural language query processor 126 with communication with, for example, the security database 128.

It should be understood that the embodiments described herein are not limited to the specific architecture illustrated in FIG. 6, and other architectures may be equally used without departing from the scope of the disclosed embodiments.

Furthermore, in certain embodiments the inspector 122, the inspection controller 124, the security database 128, and the like may be implemented with the architecture illustrated in FIG. 6. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for dynamically applying controls on a representation of a computing environment utilizing a large language model, comprising:
   generating a representation of the computing environment, the representation based on a unified data schema;
   receiving a natural language query directed to the computing environment;
   generating a first prompt for the large language model (LLM), which when processed outputs an identifier of a policy from a policy engine;
   generating a second prompt for the LLM, which when processed outputs a generated policy, based on: the unified data schema, and the natural language query; and
   applying the generated policy on the representation of the computing environment.

2. The method of claim 1, further comprising:
   generating the second prompt further based on a preexisting policy.

3. The method of claim 1, further comprising:
   generating the second prompt in response to determining that the first prompt, when processed, outputs no identifier of a policy.

4. The method of claim 1, further comprising:
   generating a plurality of second prompts, each second prompt outputting a unique generated policy of a plurality of generated policies.

5. The method of claim 4, further comprising:
   selecting a generated policy of the plurality of generated policies; and
   applying the selected generated policy.

6. The method of claim 1, further comprising:
   applying the generated policy on the representation of the computing environment, wherein the representation includes a plurality of representations, each representation representing a sub-environment of the computing environment.

7. The method of claim 1, further comprising:
   generating the first prompt based on: the unified data schema, and a plurality of preexisting policies of a policy engine.

8. The method of claim 1, further comprising:
   matching the received natural language query to a policy of a plurality of preexisting policies; and
   generating the second prompt in response to determining that there is no match between the received natural language query and the policy.

9. A non-transitory computer-readable medium storing a set of instructions for dynamically applying controls on a representation of a computing environment utilizing a large language model, the set of instructions comprising:
   one or more instructions that, when executed by one or more processors of a device, cause the device to:
   generate a representation of the computing environment, the representation based on a unified data schema;
   receive a natural language query directed to the computing environment;
   generate a first prompt for the large language model (LLM), which when processed outputs an identifier of a policy from a policy engine;
   generate a second prompt for the LLM, which when processed outputs a generated policy, based on:
   the unified data schema, and the natural language query; and
   apply the generated policy on the representation of the computing environment.

10. A system for dynamically applying controls on a representation of a computing environment utilizing a large language model comprising:
    one or more processors configured to:
    generate a representation of the computing environment, the representation based on a unified data schema;

receive a natural language query directed to the computing environment;

generate a first prompt for the large language model (LLM), which when processed outputs an identifier of a policy from a policy engine;

generate a second prompt for the LLM, which when processed outputs a generated policy, based on:

the unified data schema, and the natural language query; and apply the generated policy on the representation of the computing environment.

11. The system of claim 10, wherein the one or more processors are further configured to:

generate the second prompt further based on a preexisting policy.

12. The system of claim 10, wherein the one or more processors are further configured to:

generate the second prompt in response to determining that the first prompt, when processed, outputs no identifier of a policy.

13. The system of claim 10, wherein the one or more processors are further configured to:

generate a plurality of second prompts, each second prompt outputting a unique generated policy of a plurality of generated policies.

14. The system of claim 13, wherein the one or more processors are further configured to:

select a generated policy of the plurality of generated policies; and apply the selected generated policy.

15. The system of claim 10, wherein the one or more processors are further configured to:

apply the generated policy on the representation of the computing environment, wherein the representation includes a plurality of representations, each representation representing a sub-environment of the computing environment.

16. The system of claim 10, wherein the one or more processors are further configured to:

generate the first prompt based on:

the unified data schema, and a plurality of preexisting policies of a policy engine.

17. The system of claim 10, wherein the one or more processors are further configured to:

match the received natural language query to a policy of a plurality of preexisting policies; and generate the second prompt in response to determining that there is no match between the received natural language query and the policy.

* * * * *